(12) United States Patent
Godenzi

(10) Patent No.: US 8,672,265 B2
(45) Date of Patent: Mar. 18, 2014

(54) CONTAINER FOR AIR FREIGHT TRANSPORT AND FUSELAGE OF AN AIRCRAFT FOR FREIGHT TRANSPORT

(75) Inventor: Christian Godenzi, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1114 days.

(21) Appl. No.: 12/042,508

(22) Filed: Mar. 5, 2008

(65) Prior Publication Data

US 2008/0264936 A1  Oct. 30, 2008

(30) Foreign Application Priority Data

Mar. 5, 2007 (FR) .................................... 07 53637

(51) Int. Cl.
 *B64C 1/20* (2006.01)
(52) U.S. Cl.
 USPC ...................................... 244/118.1; 244/119
(58) Field of Classification Search
 USPC ........ 244/118.1, 119, 120, 118.2, 118.5, 121, 244/138 R, 140; 108/57.12
 See application file for complete search history.

(56) References Cited

U.S. PATENT DOCUMENTS

| | | |
|---|---|---|
| 1,438,685 A | 12/1922 | Belcher |
| 1,541,976 A | 6/1925 | Longren |
| 1,545,129 A | 7/1925 | Cook, Jr. |
| 1,555,409 A | 9/1925 | Gilmore |
| 1,619,372 A | 3/1927 | Adolf |
| 1,765,189 A | 6/1930 | Woolgar, Jr. |
| 1,775,386 A | 9/1930 | Joseph |
| 1,790,144 A | 1/1931 | Haller |
| 1,799,889 A | 4/1931 | Claudius |
| 1,810,762 A | 6/1931 | Gish |
| 1,814,556 A | 7/1931 | Jewett, Jr. |
| 1,829,922 A | 11/1931 | Cams |
| 1,988,079 A | 1/1935 | Knut |
| 2,006,468 A | 7/1935 | Longren |
| 2,081,490 A | 5/1937 | Marski |
| 2,171,434 A | 8/1939 | Ragsdale et al. |
| 2,347,542 A | 4/1944 | Cyron et al. |
| 2,382,357 A | 8/1945 | Michael |
| 2,382,817 A * | 8/1945 | Reiss ............................... 244/5 |

(Continued)

FOREIGN PATENT DOCUMENTS

| | | |
|---|---|---|
| DE | 676459 | 6/1939 |
| DE | 687456 | 6/1940 |

(Continued)

OTHER PUBLICATIONS

Application and File History for U.S. Appl. No. 11/070,648, filed Mar. 2, 2005, inventor Sarpy.

(Continued)

*Primary Examiner* — Timothy D Collins
*Assistant Examiner* — Brian M O'Hara
(74) *Attorney, Agent, or Firm* — Patterson Thuente Pedersen, P.A.

(57) ABSTRACT

A container assembly and aircraft fuselage for air transport of freight. The container assembly includes a spacer layer formed of malleable material. The spacer layer is positioned between and in contact with a bottom plate of the container and the floor of an aircraft. The aircraft fuselage for the freight transport is equipped with a floor adapted to receive and bear a load. A spacer layer integral with the floor is positioned between the floor and the load. The spacer layer is formed of a malleable material.

7 Claims, 2 Drawing Sheets

(56) References Cited

U.S. PATENT DOCUMENTS

| | | | |
|---|---|---|---|
| 2,416,245 A | 2/1947 | Water et al. | |
| 2,430,643 A | 11/1947 | Marhoefer | |
| 2,540,482 A | 2/1951 | Hervey | |
| 2,791,386 A | 5/1957 | Howard | |
| 2,902,597 A | 9/1959 | Leidy et al. | |
| 2,973,073 A | 2/1961 | Elliott | |
| 3,249,327 A | 5/1966 | Smith, Jr. | |
| 3,256,670 A | 6/1966 | Ennio | |
| 3,361,401 A | 1/1968 | Hanifan | |
| 3,436,038 A | 4/1969 | Cox et al. | |
| 3,439,790 A * | 4/1969 | Edlund et al. | 193/35 R |
| 3,440,976 A | 4/1969 | Burne | |
| 3,640,491 A | 2/1972 | Harrison | |
| 3,727,870 A | 4/1973 | Bass | |
| 4,147,111 A * | 4/1979 | Weingarten | 410/92 |
| 4,198,018 A | 4/1980 | Brault | |
| 4,200,946 A | 5/1980 | Lawrence | |
| 4,479,621 A | 10/1984 | Bergholz | |
| 4,674,712 A | 6/1987 | Whitener et al. | |
| 4,776,534 A | 10/1988 | Bamford | |
| 4,909,655 A | 3/1990 | Anderson | |
| 5,086,996 A * | 2/1992 | Roeder et al. | 244/119 |
| 5,088,661 A | 2/1992 | Whitener | |
| 5,171,510 A | 12/1992 | Barquet et al. | |
| 5,301,914 A | 4/1994 | Yoshida et al. | |
| 5,496,001 A | 3/1996 | Skow | |
| 5,534,354 A | 7/1996 | Gregg et al. | |
| 5,542,626 A | 8/1996 | Beuck et al. | |
| 5,553,437 A | 9/1996 | Navon | |
| 5,806,797 A | 9/1998 | Micale | |
| 5,954,111 A | 9/1999 | Ochoa | |
| 6,070,831 A | 6/2000 | Vassiliev et al. | |
| 6,105,902 A | 8/2000 | Pettit | |
| 6,114,050 A | 9/2000 | Westre et al. | |
| 6,170,157 B1 | 1/2001 | Munk et al. | |
| 6,250,361 B1 | 6/2001 | Ochoa | |
| 6,364,250 B1 | 4/2002 | Brinck et al. | |
| 6,474,600 B1 | 11/2002 | Apps | |
| 6,539,571 B1 | 4/2003 | Forsyth | |
| 6,554,225 B1 | 4/2003 | Anast et al. | |
| 6,804,927 B2 | 10/2004 | Forsyth et al. | |
| 6,834,833 B2 | 12/2004 | Sankrithi | |
| 6,926,235 B2 | 8/2005 | Ouellette et al. | |
| 7,163,178 B2 | 1/2007 | Ricaud | |
| 7,234,667 B1 | 6/2007 | Talmage, Jr. | |
| 7,316,372 B2 | 1/2008 | Sarpy | |
| 7,407,134 B2 | 8/2008 | Bietenhader | |
| 7,597,287 B2 | 10/2009 | Gay | |
| 7,775,478 B2 | 8/2010 | Wood et al. | |
| 7,891,608 B2 | 2/2011 | Rawdon et al. | |
| 8,025,253 B2 | 9/2011 | Sprenger | |
| 2005/0230528 A1 | 10/2005 | Gay | |
| 2005/0230538 A1 | 10/2005 | Sarpy | |
| 2006/0065773 A1 | 3/2006 | Grant | |
| 2006/0108477 A1 | 5/2006 | Helou, Jr. | |
| 2008/0078129 A1 | 4/2008 | Wood et al. | |
| 2008/0272236 A1 | 11/2008 | Rawdon et al. | |
| 2008/0283665 A1 | 11/2008 | Rouyre | |
| 2009/0026770 A1 | 1/2009 | Huntemann | |
| 2009/0121082 A1 | 5/2009 | Godenzi | |
| 2009/0146007 A1 | 6/2009 | Keeler et al. | |
| 2009/0173826 A1 | 7/2009 | Estell et al. | |
| 2009/0230241 A1 | 9/2009 | Heller et al. | |
| 2009/0236472 A1 | 9/2009 | Wood | |
| 2009/0294587 A1 | 12/2009 | Ricaud et al. | |
| 2009/0302157 A1 | 12/2009 | Ricaud | |
| 2009/0324356 A1 | 12/2009 | Schulze et al. | |
| 2010/0001129 A1 | 1/2010 | Guering | |
| 2010/0012773 A1 | 1/2010 | Im | |
| 2010/0032520 A1 | 2/2010 | Mauran et al. | |
| 2010/0032523 A1 | 2/2010 | Gallant et al. | |
| 2010/0038024 A1 | 2/2010 | Brandt | |
| 2010/0108808 A1 | 5/2010 | Allain et al. | |
| 2010/0116932 A1 | 5/2010 | Helou, Jr. | |
| 2010/0140403 A1 | 6/2010 | Barre et al. | |
| 2010/0163669 A1 | 7/2010 | Im | |
| 2010/0187352 A1 | 7/2010 | Yavilevich | |
| 2010/0282903 A1 | 11/2010 | Gauthie et al. | |
| 2011/0001006 A1 | 1/2011 | Delahaye et al. | |
| 2011/0001008 A1 | 1/2011 | Delahaye et al. | |
| 2011/0180657 A1 | 7/2011 | Gionta et al. | |

FOREIGN PATENT DOCUMENTS

| | | |
|---|---|---|
| DE | 1060264 | 6/1959 |
| DE | 3141869 | 5/1983 |
| DE | 29713530 | 9/1997 |
| DE | 19841799 | 7/1999 |
| EP | 1564141 | 8/2005 |
| EP | 1614625 | 1/2006 |
| FR | 512728 | 1/1921 |
| FR | 933229 | 4/1948 |
| FR | 1004041 | 3/1952 |
| FR | 2 689 851 | 10/1993 |
| FR | 2863673 | 6/2005 |
| FR | 2900125 | 10/2007 |
| GB | 110433 | 10/1917 |
| GB | 367048 | 2/1932 |
| GB | 439954 | 12/1935 |
| GB | 494936 | 11/1938 |
| GB | 2196922 | 5/1988 |
| GB | 2196923 | 5/1988 |
| GB | 2268461 | 1/1994 |
| GB | 2320002 | 6/1998 |
| JP | 2003342957 | 12/2003 |
| WO | WO2004/080833 | 9/2004 |
| WO | WO 2004/080833 A1 | 9/2004 |
| WO | WO2007/122096 | 11/2007 |
| WO | WO2007/134790 | 11/2007 |
| WO | WO2008/043940 | 4/2008 |

OTHER PUBLICATIONS

Application and File History for U.S. Appl. No. 11/090,477, filed Mar. 25, 2005, inventor Gay.

Application and File History for U.S. Appl. No. 12/297,604, filed Mar. 9, 2009, inventors Ricaud et al.

Application and File History for U.S. Appl. No. 12/301,982, filed Jul. 16, 2010, inventors Gauthie et al.

Application and File History for U.S. Appl. No. 12/444,972, filed Jul. 22, 2009, inventors Gallant et al.

Application and File History for U.S. Appl. No. 12/634,311, filed Dec. 9, 2009, inventor Barre et al.

* cited by examiner

CONTAINER FOR AIR FREIGHT TRANSPORT AND FUSELAGE OF AN AIRCRAFT FOR FREIGHT TRANSPORT

RELATED APPLICATION

The present application claims priority to French Application No. 07 53637 filed Mar. 5, 2007, which is incorporated herein in its entirety by reference.

FIELD OF THE INVENTION

The invention concerns a container for air freight transport as well as the fuselage of an aircraft to be used for freight transport. More precisely, the invention concerns an interspaced layer of malleable material to be placed between the container and the floor of the aircraft.

BACKGROUND OF THE INVENTION

In the domain of freight transport via airplanes, loading the interior of aircraft fuselages with products having varying degrees of rigidity and/or density is current practice. These products are most often installed in or on a rigid structure such as a container or a palette before being attached to the floor of the aircraft. The rigidity and/or density of these containers or palettes results in stresses, to a greater or lesser degree, on the structure of the aircraft and more particularly on the floor on which these containers or palettes are resting.

During flight, the aircraft is subject to different aerodynamic constraints which tend to move the floor of the aircraft elastically. For example, when the aircraft is in flight, the floor located around the trunk of the fuselage supporting the wing tends to flex to follow flexion in the wing box under the vertical load. Hence, as is shown in FIGS. 1 and 2 for the prior art, the distribution of loads on the floor of the aircraft varies depending on whether the aircraft is on the ground or in flight.

FIG. 1 shows a section of an aircraft at the wing box 2 of said aircraft, the aircraft being on the ground; FIG. 2 shows the same section of the aircraft when the aircraft is in flight.

The fuselage 1 is traversed in its lower part by the wing box 2. A floor 3 supports a rigid container 4. Generally speaking, in the subsequent description, a container means a crate, a palette, or any other rigid transport element that may be attached to the floor of an aircraft.

The container 4 rests along its entire lower surface 7 on the floor 3 such that the entire floor 3 produces work.

Conversely, when the aircraft is in flight, as is shown in FIG. 2 for the prior art, the distribution of loads is modified. In effect, the central wing box 2 is deformed due to the aerodynamic stresses undergone by the wing 8 which results in elastic movement in the floor attached to said central wing box 2.

The container 4 is then only supported by the lateral parts 5 and 6 of the floor 3 on which it is attached and which are themselves attached to the latter walls of the fuselage 1. The stresses are then no longer uniformly distributed to the entire surface of the floor 3 which initially supported the container 4, but are concentrated in the lateral parts 5 and 6 of the floor 3 where the container 4 is attached to the floor 3.

In the prior art, to alleviate this elastic movement in the floor 3 which tends to concentrate the stresses to the lateral areas 5, 6 of said floor 4, the floor 3 is reinforced with materials around the areas of the floor which are stressed during flight. This addition of materials contributes to a significant and permanent increase in the total mass of the aircraft, even though the problem of the poor distribution of the load on the floor structure of the aircraft is encountered only when transporting containers that are rigid and/or dense, and which are not capable of elastic movement to follow the elastic movement of the structure of the floor during flight. Even though the problem is encountered only occasionally, the mass of the aircraft is affected permanently by the addition of material forming the lateral reinforcements.

SUMMARY OF THE INVENTION

One goal of the invention is to allow elastic movement in the floor independently of the container in order to allow the floor free elastic movement, all while maintaining a uniform distribution of the load on the surface of said floor.

To do this, the invention proposes to intersperse a flexible underlay between the load and the floor to which it is attached, capable of following the elastic movement in the floor during flight and capable of distributing the forces to the entire surface of said floor. The spacer underlay, given its flexibility, is capable of different elastic movements on its top surface which bears the load and on its bottom surface which rests on the floor. "Bottom" in this case means oriented towards the floor, and "top" means oriented in a direction opposite the floor. This flexible or malleable spacer underlay makes it possible to eliminate or, at the very least, to decrease considerably the periodic overloads to the floor by allowing displacement or elastic movement of the floor different from that of the load. As the flexible spacer underlay is removable, there is no permanent penalty to the aircraft from the point of view of mass, since the flexible spacer underlay may be used only when the density and/or the weight of the load to be transported requires its use. Additionally, the spacer underlay according to the invention may be adapted to different aircraft, as well as different floors, depending on the aircraft section concerned by elastic movement in the floor. It may be used directly in aircrafts currently in service, without modification to their floor structure. The flexible spacer underlay according to the invention may be incorporated with the load prior to the loading of said load into the internal volume of the aircraft's fuselage, or maybe attached to the aircraft floor prior to the introduction of the load. The flexible spacer underlay according to the invention is characterized by an outside coating which, in a preferred embodiment, bounds a pocket filled with a malleable solid or fluid. In this case, "malleable" means easily extendable in all directions.

The subject of the invention is therefore a container for air transport of freight wherein a bottom plate of said container is to rest on the floor of an aircraft which possesses a spacer layer of malleable material.

In one embodiment of the container according to the invention, an external contour of the spacer layer conforms to an external contour of the container. "External contour" in this case means the line bounding the area of the container or the spacer layer. Conversely, it is possible to stipulate that the external contour of the spacer layer be greater in all places than the external contour of the container. This may be advantageous for a container having a high-density and a small surface in order to distribute the mass of said container over a greater floor surface.

In a preferred embodiment, the spacer layer includes an external envelope made of a solid malleable material such as fabric, glass, carbon, or Kevlar bounding at least one cell that is partially filled with a malleable material. "At least partially filled" means that the material may fill up all or part of the volume of the cell, to the extent that the aptitude for elastic movement in said cell and the spacer layer more generally is maintained. The cell may be filled with liquid, gel, or gas. It is also possible to fill the cell with a solid malleable material.

Furthermore, the spacer layer may include an internal envelope, between the outer envelope and at least one cell, made of a sealed malleable material such as a plastic envelope.

A top surface of the spacer layer, which is to be in contact with the freight, can contain means for distributing forces. For example, the top surface of the spacer layer may be covered by a rigid plate capable of distributing the load of the spacer layer over a larger surface and therefore increasing the work surface. Additionally, such a rigid plate protects the spacer layer from crushing, perforations, and other physical damages of said spacer layer.

Similarly, a bottom surface of the spacer layer, which is to be in contact with the floor of the aircraft, can include mechanisms for distributing forces, such as a rigid plate.

The invention also concerns an aircraft fuselage for the freight transport equipped with a floor which is to bear a load, characterized by a spacer layer integrated into the floor which is to be arranged between the floor and the load that it bears, said spacer layer being made of a malleable material. In this case, "malleable" means easily extendable in all directions.

In one embodiment of the fuselage produced according to the invention, an external contour of the spacer layer conforms to an external contour of the floor in such a manner that said floor is entirely covered by the spacer layer. "External contour" means the line which bounds the area under consideration. Hence, it is possible to arrange any load with a large density and/or mass, at any location on the floor, without risk of poor distribution of forces during flight. Of course, it is also possible to arrange for an external contour of the spacer layer to be less than an external contour of the floor in all points. For example, it is possible to use a spacer layer whose external contour follows the external contour of the load that it is to bear. Hence, the aircraft is not necessarily affected from the point of view of mass by the presence of a spacer layer having a surface which is too large.

In one embodiment, the spacer layer includes an external envelope made of a solid malleable material such as fabric, glass, carbon, or Kevlar bounding at least one cell that is partially filled with a malleable material. "At least partially filled" means that the material may fill up all or part of the volume of the cell, to the extent that the aptitude for elastic movement in said cell and the spacer layer more generally is maintained. The cell may be filled with liquid, gel, or gas. It is also possible to fill the cell with a solid malleable material.

Furthermore, the spacer layer may include an internal envelope, between the outer envelope and at least one cell, made of a sealed malleable material such as a plastic envelope.

A top surface of the spacer layer, which is to be in contact with the freight, can contain means for distributing forces. For example, the top surface of the spacer layer may be covered by a rigid plate capable of distributing the load of the spacer layer over a larger surface and therefore increasing the work surface. Additionally, such a rigid plate protects the spacer layer from crushing, perforations, and other physical damages of said spacer layer.

Similarly, a bottom surface of the spacer layer, which is to be in contact with the floor of the aircraft, can include mechanisms for distributing forces, such as a rigid plate.

BRIEF DESCRIPTION OF THE DRAWINGS

The invention will be better understood by reading the description which follows and examining the drawings which accompany it. These are presented for informational purposes only and in no way limit the invention. The drawings show.

DETAILED DESCRIPTION OF THE DRAWINGS

In the invention, in order to limit the periodic overloads, that is to say local overloads, on the floor of an aircraft bearing a load having a significant density and/or mass, we propose using a spacer layer made of malleable material which allows displacement and/or elastic movement of said floor different from that of the load or container.

Figure 1:
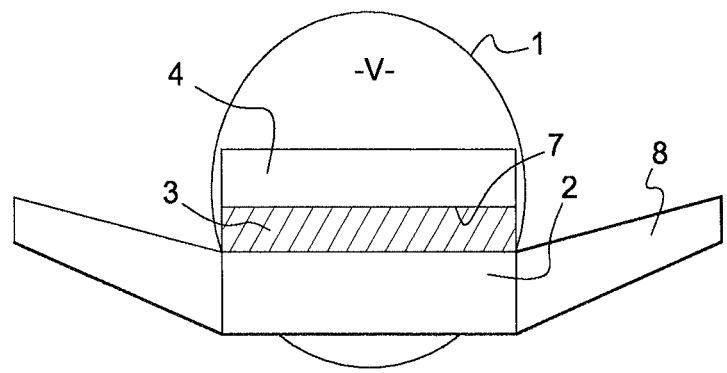
FIG. 1 is a cross-sectional schematic diagram of an aircraft section in the previously described prior art, shown around the wing box for said aircraft when it is on the ground.
Figure 2:
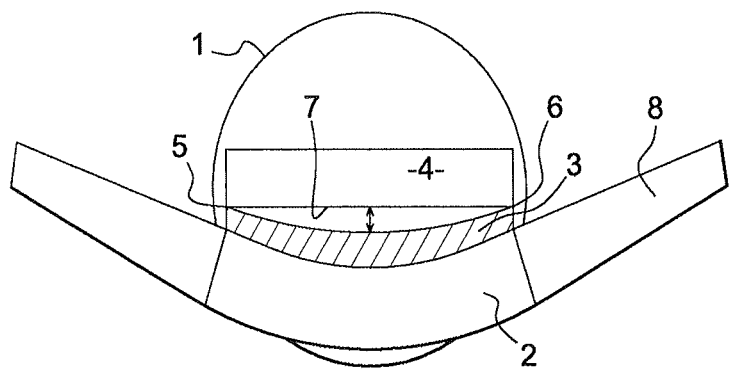
FIG. 2 is the cross-sectional view of an aircraft section according to FIG. 1, when said aircraft is in flight, according to the previously described prior art.
Figure 3:
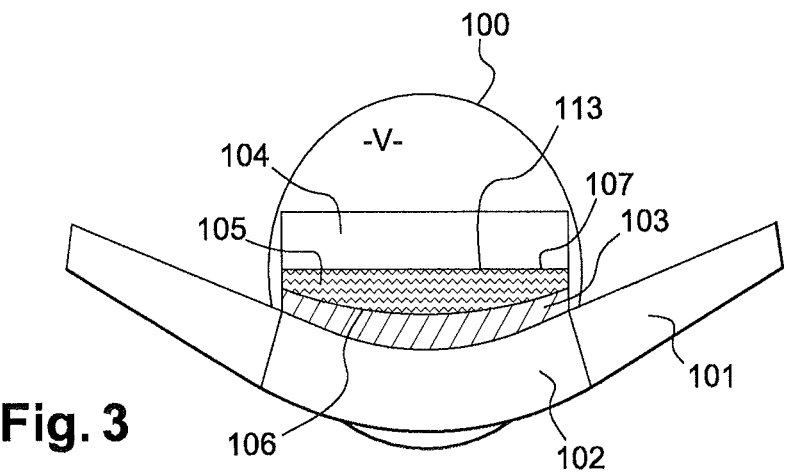
FIG. 3 is a cross-sectional schematic diagram of an aircraft fuselage around the wing box, equipped with a spacer layer according to an embodiment of the invention.

FIG. 3 shows a cross-sectional view of a fuselage 100 of an aircraft utilized for freight transport around the wing 101 of said aircraft according to an embodiment of the invention, while the aircraft is in flight.

The fuselage 100 is traversed in its lower part by the wing box 102. When the aircraft is in flight, as shown in FIG. 3, the wing 101 undergoes bending which tends to shorten the upper surface of the wing and extend the lower surface. The elastic movement of the wing 101 results in elastic movement of the wing box 102 and the floor 103 attached to said wing box 102. The elastic movement is found primarily in the flexing of the floor 103 and the wing box 102.

As can be seen in FIG. 3, a container 104 is placed in the internal volume "V" of the fuselage 100 and rests on the floor 103 on a spacer layer 105, said spacer layer 105 covering the floor. More precisely, a bottom surface 106 of the spacer layer 105 rests on the floor 103, while a top surface 107 of said spacer layer 105 supports the container 104. "Bottom" in this case means directed towards the floor, or the ground, and "top" means directed towards the sky or the internal volume of the fuselage.

Because of its flexible structure, the internal layer 105 follows any elastic movement in the floor 103 and flexes downward around the bottom surface 106. Conversely, the upper part of the spacer layer 105, where the container 104 rests, remains rather flat and parallel to the bottom plate 113 of the container 104.

Hence, the mass of container 104 is distributed along the same surface of the floor 103 when the aircraft is in flight and when the aircraft is on the ground. The working surface of the floor 103 thus remains the same during the entire transport of the container 104, and is no longer concentrated at the points of attachment between the floor and the container when flying.

When the aircraft is on the ground, and the floor 103 is not subject to any elastic movement, the spacer layer 105 is level and extends in parallel to the surface of the floor 104.

Figure 6:
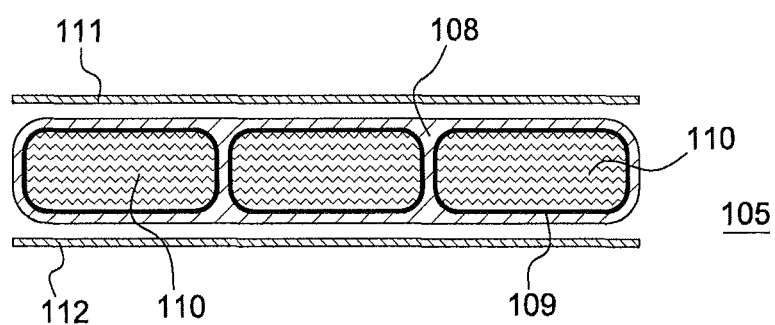
FIG. 6 is a cross-sectional schematic diagram of a spacer layer according to an embodiment of the invention.
Figure 7:
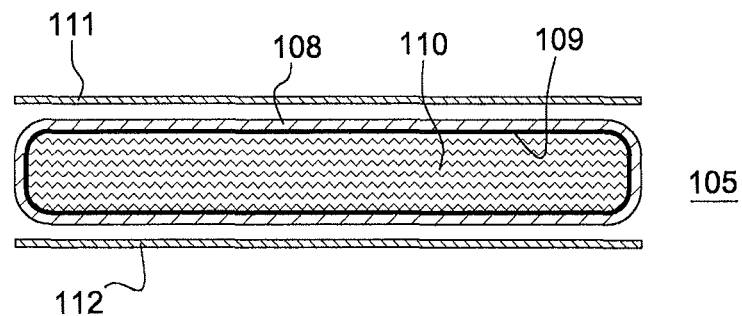
FIG. 7 is a cross-sectional schematic diagram of a spacer layer according to an embodiment of the invention

FIGS. 6 and 7 show two cross-sectional views of embodiments of the spacer layer 105 according to an embodiment of the invention.

The spacer layer 105 generally possesses an outer envelope 108 which can be produced in a preferred embodiment using a solid malleable material capable of resisting impacts all while remaining flexible. The external envelope 108 encloses a pocket or cell 110 filled with a material which is also malleable such as a gel, liquid, gas, or flexible solid material. In the event that the cell 110 is filled with a gaseous malleable material, in the form of a gel or liquid, the spacer layer 105 is reinforced in a preferred embodiment with an internal envelope 109 made of an airtight material. The internal envelope 109 is arranged between the outer envelope 108 and the cell 110. Of course, the outer envelope 108 and the internal envelope 109 may form one and the same envelope made of a solid and airtight malleable material.

In an embodiment shown in FIG. 7, the spacer layer 105 possesses a single cell 110, while in an alternative embodiment shown in FIG. 6, the spacer layer possesses multiple cells 110,3 of which are visible in FIG. 6. The partitioning of the internal volume of the spacer layer 105 into multiple cells 110 enables a reduction in the risk that the liquid, gas, or gel filling the cells 110 will leak should the spacer layer 105 be pierced and makes it possible to endow said spacer layer 105 with greater rigidity to one degree or another. In effect, the strength of the spacer layer 105 increases proportionally to the number of cells placed inside a given spacer layer 105.

Furthermore, in one embodiment of the invention, the spacer layer 105 can be formed of several modular elements, each modular element comprising a cell 110 bounded by an external envelope 108. The spacer layer 105 is formed as needed by assembling varying numbers of modular elements which are longitudinally placed side-by-side in such a manner as to form a spacer layer 105 for the desired surface. The modular elements may have varying sizes of cells.

The spacer layer 105 possesses mechanisms for attaching the spacer layer 105 to the rails of the floor 103. For example, the spacer layer possesses buckles or hooks capable of interacting with counterpart fasteners on the floor 103.

In one embodiment, the spacer layer 105 possesses means for distributing forces in order to spread out the forces along the entire surface of the spacer layer 105 and thus of the floor 103 on which the spacer layer 105 is resting.

For example, as is shown in FIGS. 6 and 7, it is possible to equip the spacer surface 105 with a rigid top plate 111 and/or a rigid bottom plate 112. The rigid bottom plate 111 makes it possible to compensate a local loss in thickness of the spacer layer 105 around the container and thus to distribute the forces over a greater area of the spacer layer 105. The rigid plates are attached to the outer envelope 108 by any and all fastening means, for example buckles.

In another embodiment, it is possible to provide for the rigid plates 111 and/or 112 to be replaced by a succession of beams or other rigid structures.

Figure 4:
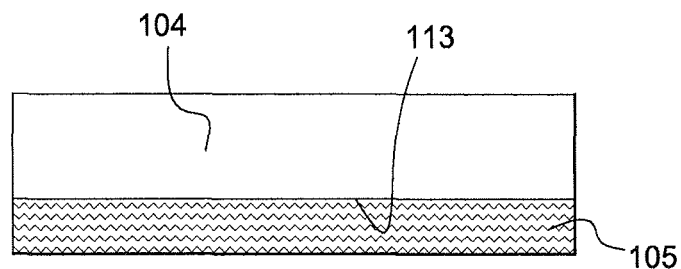
FIG. 4 is a cross-sectional schematic diagram of a container equipped with a spacer layer according to an embodiment of the invention.
Figure 5:
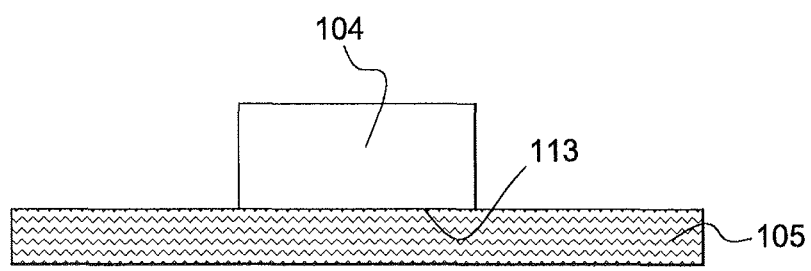
FIG. 5 is a cross-sectional schematic diagram of a container equipped with a spacer layer according to an embodiment of the invention.

In one embodiment of the invention, the spacer layer 105 is attached directly to the container 104, as is shown in FIGS. 4 and 5.

In FIG. 4, the spacer layer 105 has an external contour which closely follows the outer contour of the container 104. The spacer layer 105 is then, for example, integrated directly into the construction of the container 104 in such a way as to form the bottom plate 113 of said container 104.

In an embodiment depicted in FIG. 5, the outer contour of the container 104 lies within the outer contour of the spacer layer 105 at all points, such that the container 104 rests on only one part of the spacer layer 105. Such an embodiment can be used in the case in which the container 104 has a very high density. In effect, the use of a spacer layer 105 which has dimensions greater than the dimensions of the container 104 makes it possible to decrease the lumped mass of the container 104 by distributing the forces over a large ground surface, that is over a greater surface of the floor on which the spacer layer will rest.

The utilization of a rigid plate 111 between the container 104 and the spacer layer 105 also makes it possible to increase the diffusion of forces over a larger surface area of the spacer layer 105 and the floor 103 on which it will rest.

By directly integrating the spacer layer 105 into the bottom plate 104 of the container, it is possible to prepare containers independently of the aircraft into which they will be loaded.

In another embodiment of the invention, the intermediary layer 105 may be previously attached to the floor 103, the containers 104 devoid of a spacer layer are then loaded into the aircraft.

In one embodiment of the invention, the outer envelope 108 of the intermediary layer 105 is capable of withstanding pressures that are greater than at least 1 bar. The dimensions for the spacer layer 105 vary according to the dimensions of the container 104 which it must support.

The invention claimed is:

1. An aircraft fuselage of an aircraft for freight transport, the aircraft fuselage being traversed by a central wing box, the aircraft fuselage comprising:
    a floor coupled to the central wing box and adapted to receive and bear a load, the floor presenting an external contour, the floor being subject to elastic movement in response to flexion in the central wing box; and
    a spacer layer interdependent with the floor, removeable and positioned between the floor and the load, wherein the spacer layer comprises an outer envelope bounding at least one cell, the spacer layer presenting a load engaging surface and a floor engaging surface separated by a thickness of the spacer layer, the spacer layer being in continuous contact with the external contour of the floor over substantially an entire width of the floor,
    wherein the floor engaging surface of the spacer layer is elastically conformable with the external contour of the floor such that the floor engaging surface is adapted to follow the elastic movement of the floor in response to the flexion in the central wing box, and
    wherein the load engaging surface of the spacer layer is elastically conformable with the load such that the load engaging surface is adapted to follow elastic movement of the load different from the elastic movement of the floor to maintain uniform distribution of the load on the floor.

2. The aircraft fuselage according to claim 1, wherein the floor is entirely covered by the spacer layer.

3. The aircraft fuselage according to claim 1, wherein the at least one cell is at least partially filled with a malleable material.

4. The aircraft fuselage according to claim 3, wherein the spacer layer further comprises an internal envelope positioned between the outer envelope and the at least one cell, wherein the internal envelope comprises an airtight malleable material.

5. The aircraft fuselage according to claim 3, wherein the malleable material contained in the at least one cell is a liquid, gel, or gas.

6. The aircraft fuselage according to claim 1, wherein the load engaging surface of the spacer layer is positioned adjacent to and in contact with the load, and comprises means to distribute forces.

7. The aircraft fuselage according to claim 1, wherein floor engaging surface of the spacer layer is positioned adjacent to and in contact with the floor, and comprises means to distribute forces.

\* \* \* \* \*